May 17, 1949. W. OSTLING 2,470,366
AUTOMATIC SPARK ADVANCE MECHANISM
Filed Feb. 17, 1947 6 Sheets-Sheet 1

INVENTOR.
William Ostling
BY
ATTORNEY.

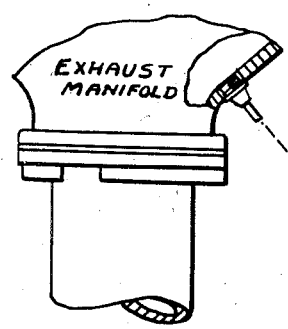
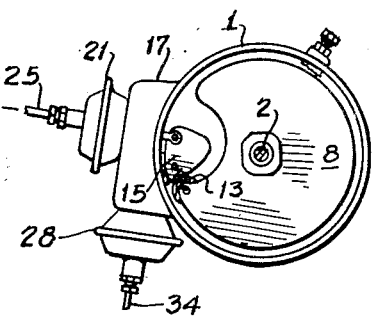
Fig. 6.
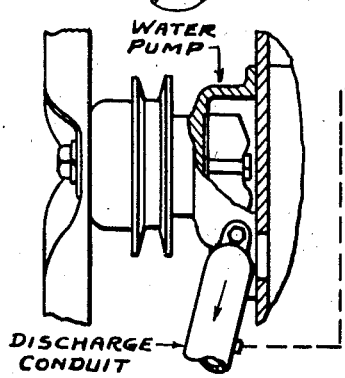
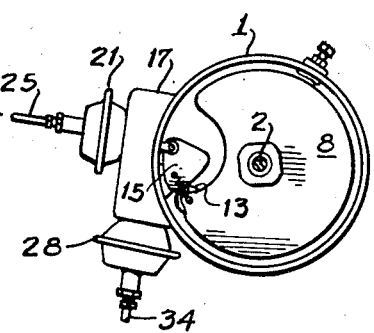
Fig. 7.
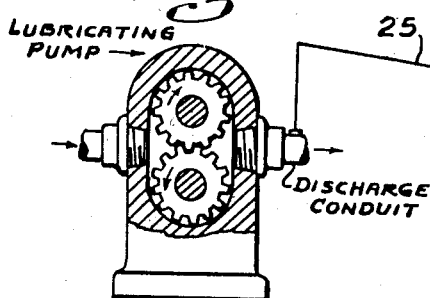
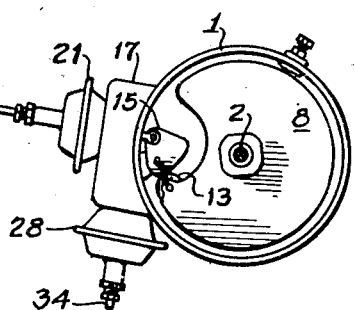
Fig. 8.
INVENTOR.
William Ostling
BY
ATTORNEY.

May 17, 1949. W. OSTLING 2,470,366
AUTOMATIC SPARK ADVANCE MECHANISM
Filed Feb. 17, 1947 6 Sheets-Sheet 3

INVENTOR.
William Ostling
BY
ATTORNEY.

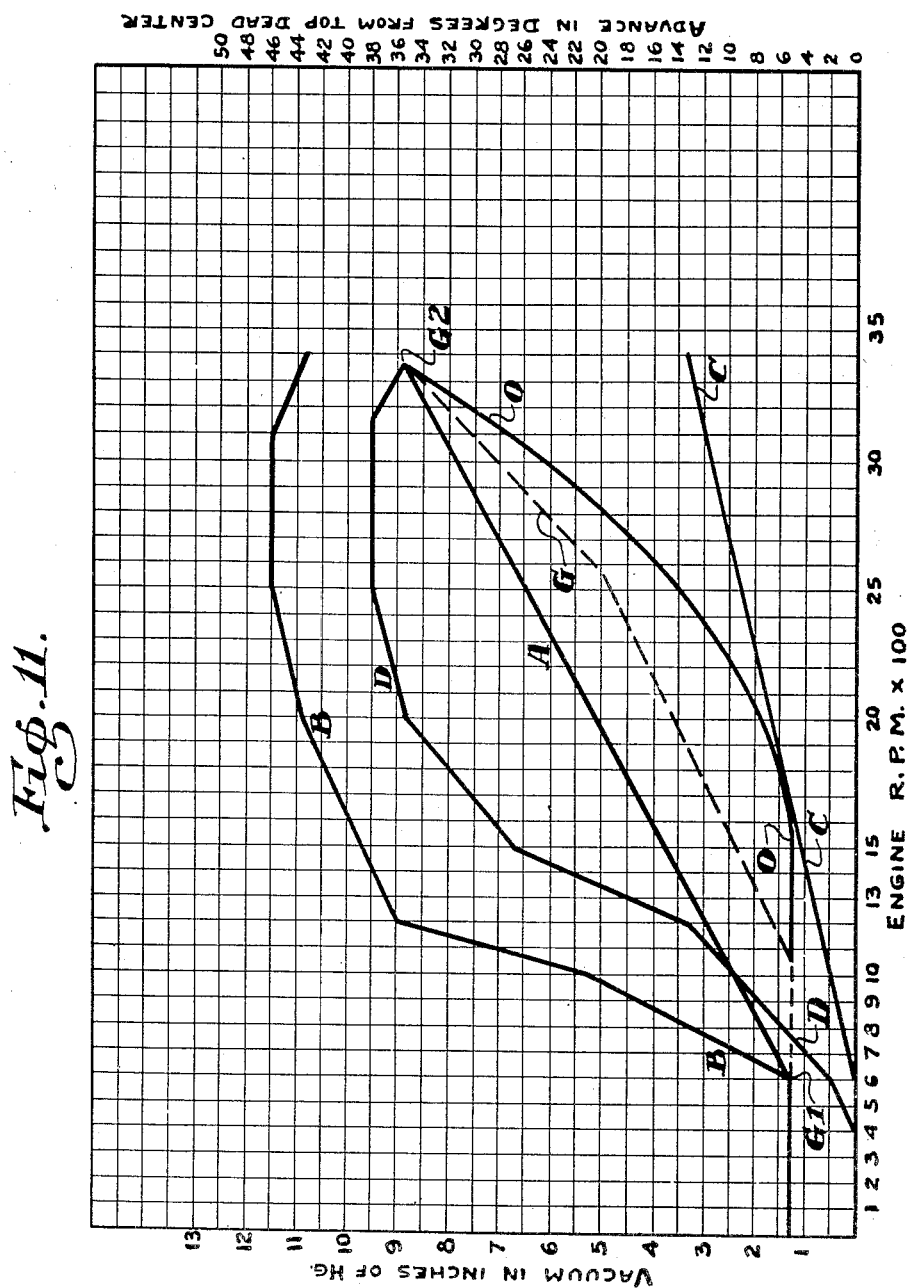

May 17, 1949.  W. OSTLING  2,470,366
AUTOMATIC SPARK ADVANCE MECHANISM
Filed Feb. 17, 1947  6 Sheets-Sheet 5

INVENTOR.
William Ostling
BY
ATTORNEY.

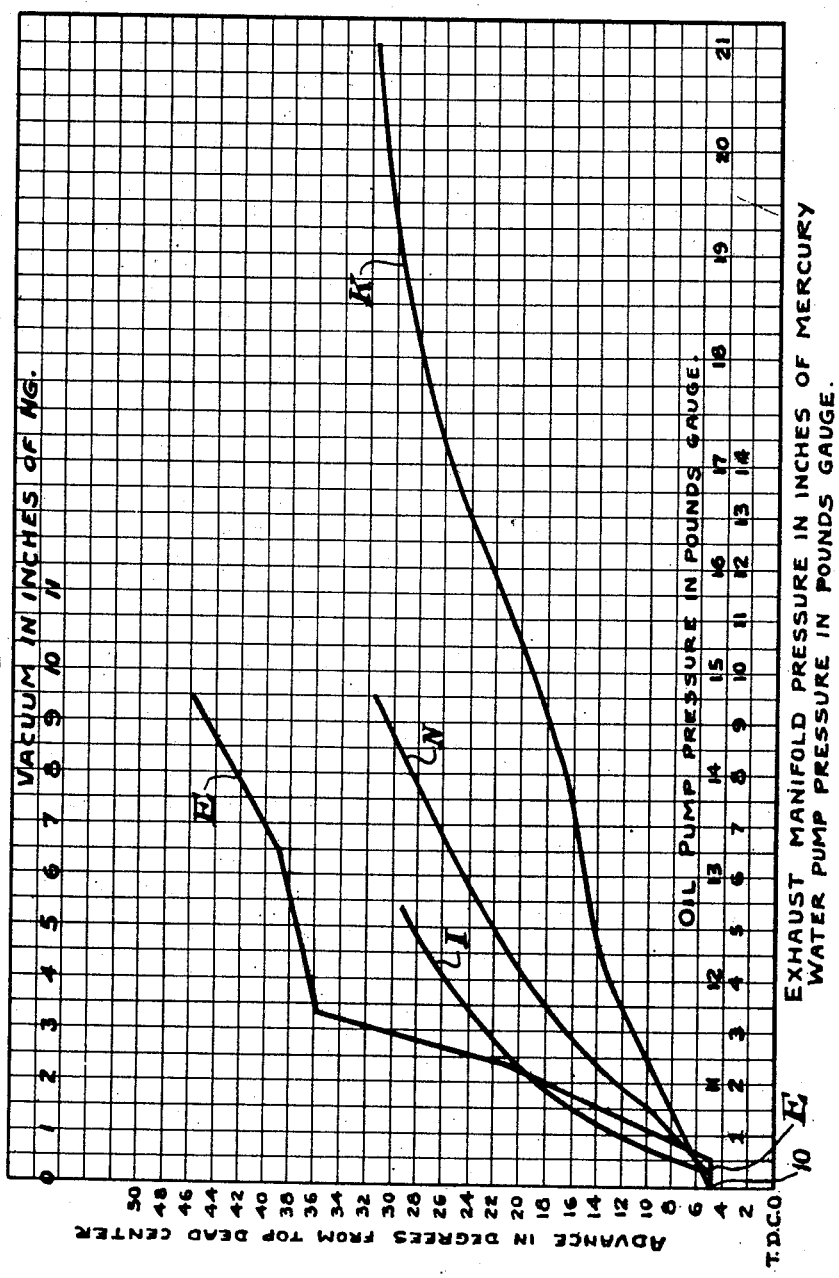

Patented May 17, 1949

2,470,366

UNITED STATES PATENT OFFICE 2,470,366

AUTOMATIC SPARK ADVANCE MECHANISM

William Ostling, Los Angeles, Calif., assignor to California Machinery and Supply Company, Ltd., Los Angeles, Calif., a corporation of Delaware Application February 17, 1947, Serial No. 728,984

40 Claims. (Cl. 123—117)

As is well recognized in this art, the spark timing has a major effect upon the efficiency of operation of a spark ignition engine. In order to obtain maximum power, ignition must occur before the compression stroke is completed, that is, before top dead center is arrived at by the piston, because the combustion process requires a finite time and it is desirable that the maximum pressure be developed in the cylinder before the expansion of the power stroke begins.

As will be seen later and as well known in this art, the higher the engine speeds, that is, the higher the linear velocity of the piston, the earlier must be the spark, in order that the combustion process have sufficient time to generate the maximum pressure by the time the piston reaches top dead center. The optimum position for the spark in relation to the stroke is determined by laboratory experimentation, as will be more fully set forth below.

The interval between the time of the spark and the arrival of the piston at top dead center is termed "the spark advance." The earlier the spark is generated in the compression stroke of the engine, the more advanced is the spark, and the nearer to the time of arrival of the piston at top dead center, the more retarded is the spark. The degree of spark advance may be measured in terms of the crank angle.

While the degree of spark advance is a function of engine speed, it is also a function of throttle position. Thus, at any engine speed the degree of spark advance desirable for part throttle operation is greater than that required for full throttle operation. The adjustment of the spark advance in a spark ignition engine is accomplished by adjusting the angular relation between the breaker cam and the breaker points. As is well known in this art, the distributor contains a cam shaft which is rotated usually at half engine speed. The cam shaft rotates a cam usually in the form of a nut with lobes equal in number to the number of cylinders fired by the distributor. Surrounding the cam shaft and concentric therewith is a non-rotating breaker plate upon which is mounted a breaker, the function of which is to open the circuit of the ignition system so that the condenser discharges across the cylinder plug points. The angular relationship between the breaker and the cam determines the point in the stroke of the piston when the breaker points will separate and the spark will jump.

The term "full load" refers to that load which is imposed upon the engine at full open throttle position at any given speed. In other words, it is the maximum load which may be imposed upon an engine when the throttle is wide open in order that a particular chosen speed be maintained at a steady rate.

"Part load" or "load at part throttle position" is that load which at any given speed is tolerable at any throttle position less than full.

"Road load" is that load which is at part throttle position. "Road load" has become a rather generally recognized term in this art to specify as standard a part load which corresponds to the load on an engine equivalent to that imposed by an automobile of medium weight with three people of average size when driving on a straight road without acceleration. This rather arbitrary loading corresponds to about a 35° throttle opening at speeds of about 3400 R. P. M. Road load may thus be stated as the load imposed on an engine operating at 3400 R. P. M. at sea level with the throttle, for example, at 35° from fully closed. With such road load imposed on the engine, as the throttle is opened beyond 35° the engine speeds up under such constant road load, and as the throttle is closed the engine slows down.

In order to determine the best spark position for all conditions of operation of the engine, the engine is tested under load either in a dynamometer or on the road and the spark is set manually by adjusting the breaker plate for all conditions of throttle position and speed to establish what is known as the ideal spark advance curves for full load and road load positions. If the spark is controlled to advance along these curves at full load and road load they will also be adequate at intermediate load conditions. Such curves and spark advance settings are hereafter referred to as ideal or optimum curves or settings.

During cranking and idling the spark for best operation is retarded. When operating at road load, the spark should be advanced, the degree of advance being greater as the speed at road load operations is higher. As the throttle is opened wider to full throttle position for full load operations the spark is best retarded, but at full throttle operation the spark should be more advanced the higher the speed at full load, i. e., wide open throttle.

Spark ignition internal combustion engines, particularly those used in the automotive field, have devices for automatically adjusting the spark advance in relation to engine speed and also in relation to the throttle position at such engine speed. One method employed is to attach the cam to centrifugal weights which are rotated by the cam shaft. As the engine speed increases the weights move out under centrifugal force and rotate the breaker cam relative to the drive shaft, thus advancing the spark. However, since at part throttle operation a greater spark advance at any engine speed is desirable than that for full throttle operation, it is desirable that the spark advance mechanism at part throttle operation advance the spark an amount in addition to that which is obtainable from the centrifugal spark advance mechanism. In one standard type of such device now employed the breaker plate is advanced above that obtainable from the centrifugal weight by means of a link connected to a pneumatically operated power means for actuating the link. This means is conventionally a diaphragm position in a chamber which is in turn connected to an orifice positioned at the throttle in the air fuel induction system.

In another form of such automatic spark advance, such as represented by the Vanderpoel and Ostling Patent No. 2,249,446, the centrifugal weights are omitted and the entire advance is pneumatically controlled.

In addition to the orifice positioned at the throttle, an orifice is placed either at the main carburetor venturi or at an auxiliary venturi, as described in the co-pending application Serial No. 694,266, filed August 31, 1946, by Garth L. Young and William Ostling. A by-pass is provided between the two orifices which are in turn connected to the pneumatic power means, specifically the diaphragm chamber similar to that described above. If desired a check valve may be placed in this by-pass. With such an arrangement the centrifugal weights may be entirely omitted and the spark advance may be obtained entirely by the rotation of the breaker plate by means of a stem connected to the diaphragm in the diaphragm chamber.

With such an arrangement at idling position the throttle orifice is on the carburetor side of the throttle and the velocity is so low that the vacuum generated is low. It is insufficient to advance the spark. When the throttle is opened to part throttle position the throttle orifice is on the manifold side of the throttle and is subjected to the vacuum of the intake manifold but this vacuum is in part bled through the Venturi orifice which is, of course, at a higher pressure, i. e., lower vacuum, and this modifies the excessive vacuum thus created by the manifold and the spark is advanced. When the throttle is opened to full open position, such as in the full load operation, the manifold vacuum drops substantially and is at practically atmospheric, but due to the velocity of the gases through the venturi there is a vacuum at the Venturi orifice which prevents the spark from being retarded to the degree it would have been if it had only been subjected to the manifold vacuum.

By positioning the check valve when the pressure at the venturi is lower than at the throttle orifice, as it is in full throttle position, the check valve closes so that the vacuum generated at the venturi is not bled by the higher pressure in the manifold, and thus the advance of the spark is increased over that which would have been obtained if the check valve had not been present.

It is an object of my invention to improve the operation of such spark advance mechanisms.

I accomplish these objectives by moving the breaker plate to give the desired advance not by direct linkage to the vacuum operated diaphragm but through a cam linkage. I restrict this advance by vacuum generated in the diaphragm chamber of the spark advance mechanism to operations other than full load, to wit, at road load operations. The advance at full load operation is caused by a second cam linkage arrangement operated responsive to engine speed. The actuation of the full load advance by means of the full load cam is caused, in a preferred embodiment of my invention, by fluid pressure which is responsive to engine speed. Thus, I may employ the pressure of the exhaust which is a function of engine speed to actuate a diaphragm to move the cam to cause the advance at full load. In place of the exhaust pressure I may employ the pressure of the circulating oil from the discharge of the oil pump employed in spark ignition engines to circulate the lubricating oil. I may employ the pressure of the circulating cooling water. Both of these pressures increase with increase of engine speed. Another source of fluid pressure which is possible in special cases of spark ignition engines is the supercharger discharge pressure where one is at a substantially constant atmospheric or other intake pressure. Another source is the fuel pump discharge pressure, as in the case of fuel injection, spark ignition carburetors or direct injection engines.

In this manner I actuate the full load cam advance in proportion to engine speed by one cam operation actuated responsive to a fluid pressure varying in response to engine speed and cause the advance of the spark at part throttle operation responsive to the vacuums in the fuel oil passageway in the carburetor which is responsive to engine speed at such part throttle setting. In this manner I may so adjust the vacuum advance without reference to its effect upon full load advance. I am not dependent on the vacuum generated at full load to cause the advance as in the case of the prior art devices which cause both the full load and road load advance to be dependent upon the vacuum in the carburetor. By thus independently actuating the advance at road load and full load I may adjust the road load advance and full load advance independently of each other to obtain the desired advance at each type of operation at various engine speeds.

These and other objectives of my invention will appear more fully from the further description of my invention taken together with the figures and charts of which Fig. 1 is a section taken along line 1—1 of Fig. 2, being a horizontal view in part section of the spark advance mechanism according to my invention;

Fig. 6 is a view showing the connection of the spark advance mechanism to the exhaust of the engine;

Fig. 7 is a similar view but with the spark advance mechanism attached to the water pump of the engine;

Fig. 8 is a similar view showing the spark advance mechanism connected to the oil pump of the engine;

Fig. 11 is a chart showing the relationship of engine speed to vacuum generated in the diaphragm chamber of the spark advance mechanism and also the variation of spark advance with engine speed at full load and road load operations;

Figure 12:
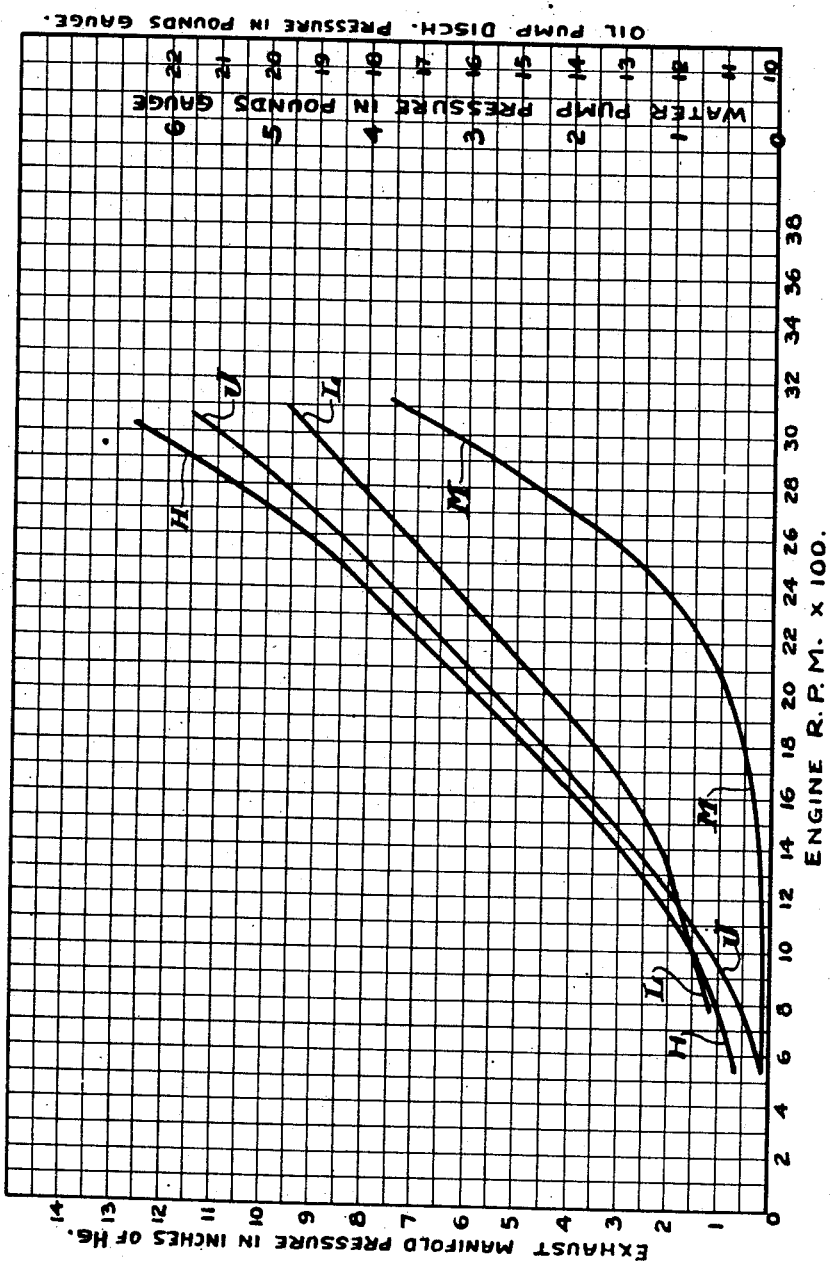

Fig. 12 is a chart showing the variation of exhaust manifold pressure at both full and road load with engine speed and also shows the variation of oil pump and water pump discharge pressure with engine speed; and Fig. 13 is a chart showing the relationship of vacuum generated in the carburetor vacuum chamber and the pressures generated in the pressure diaphragm chamber of my spark advance mechanism when employing severally the oil pump discharge pressure, exhaust manifold pressure and the water pump discharge pressure and the resultant advance obtained as a result of the imposition of such pressure.

The spark advance mechanism according to my invention is composed of case 1 in which is rotatably mounted a cam shaft in a bearing sleeve 4. The shaft 2 is rotated by a gear 3 at half engine speed by conventional connections. The shaft 2 carries a breaker cam 5 upon which is mounted a rotating contact 6 which makes contact with the distributor cap 7, as is conventional. Rotatably mounted on sleeve 4 is a sleeve 11 upon which is mounted a breaker plate 8. The breaker plate 8, as is conventional, carries a circuit breaker 9 which is connected through the condenser 10 in an electrical circuit to the spark plugs, as is conventional.

Figures 1, 2:
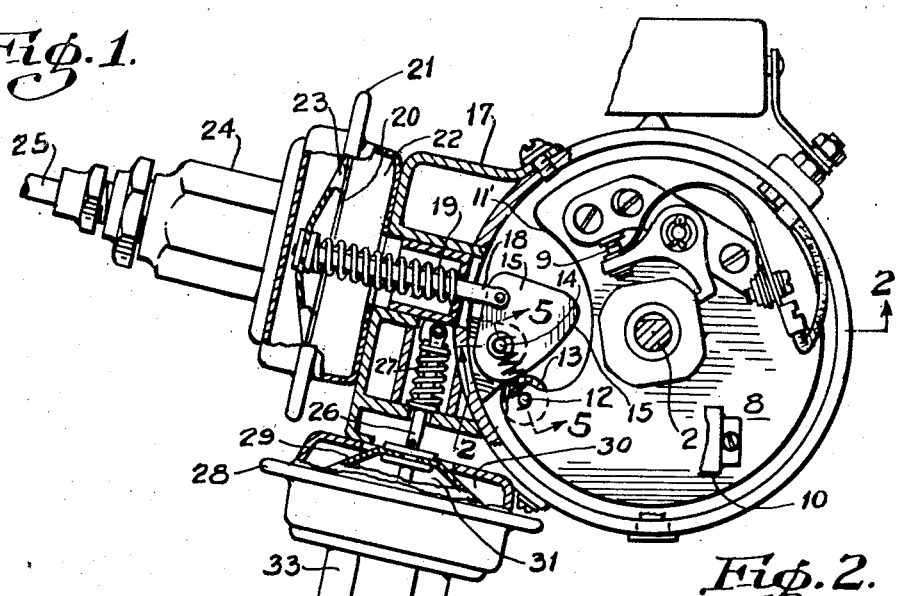
Fig. 2 is a vertical view in part section taken along line 2—2 of Fig. 1 with parts broken away and other parts removed for clarification.
Figure 3:
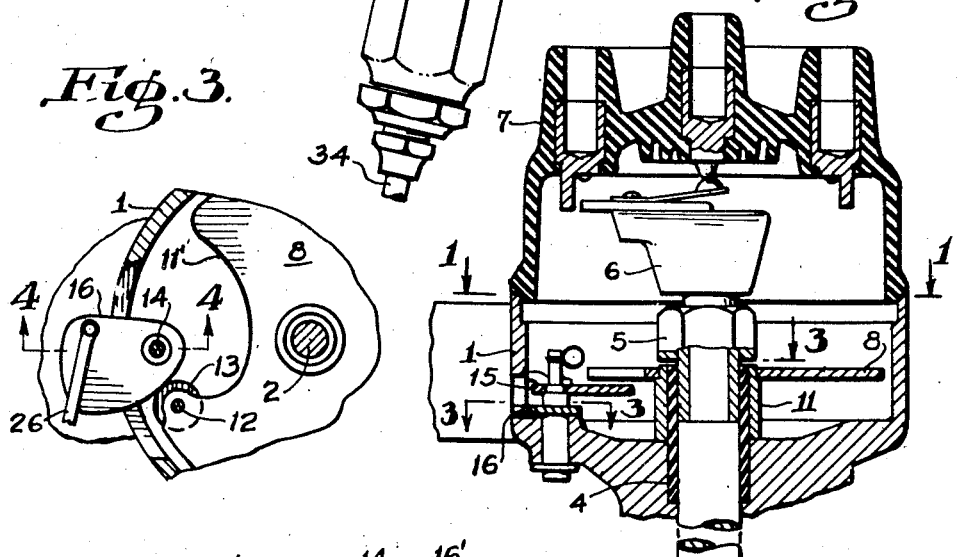
Fig. 3 is a fragmentary section taken along line 3—3 of Fig. 2.
Figures 4, 5:
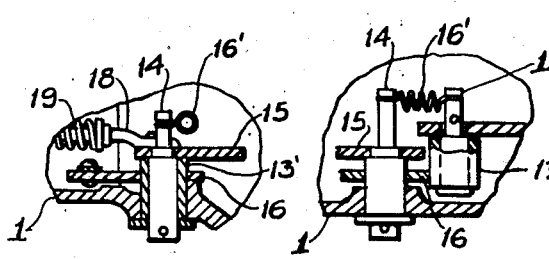
Fig. 4 is a fragmentary section taken along line 4—4 of Fig. 3, showing the cams in one position.
Fig. 5 is a view similar to Fig. 4 taken on line 5—5 of Fig. 1 in another position.

In the spark advance mechanism of my invention, as is shown in Figs. 1, 2, and 3, the breaker plate 8 is cut away at 11' and carries a pin 12 upon which is mounted a cam follower 13. Mounted in the base of case 1 is a rotatable sleeve 13' upon which is mounted a cam 16 for rotation with said sleeve. Rotatably mounted within the sleeve 13' and mounted for rotation independently of the sleeve 13' is a pin 14 upon which is mounted a cam 15 for rotation with said pin. The pin 14 is connected to the pin 12 by means of a spring 16'.

Mounted upon case 1 is a housing 17. A rod 18 is reciprocably mounted in housing 17. Rod 18 is connected to the cam 15. The inward motion of the rod is opposed by a retarding spring 19. The rod 18 is connected by a hinge pin to a diaphragm 20 mounted within a housing 21 to provide a chamber 23 on one side of the diaphragm and a chamber 22 on the other side of the diaphragm which is open to the case. Chamber 23 is connected by coupling 24 to conduit 25.

A rod 26 is also reciprocably mounted in the housing 17 at right angles to the rod 18 and the outward motion of the rod 26 is opposed by a retarding spring 27. The rod 26 is connected to diaphragm 29 positioned in the chamber 28 in a manner similar to rod 18. The chamber 30 which is open to the case and a chamber 31 are connected by means of fitting 33 to line 34.

Figure 10:
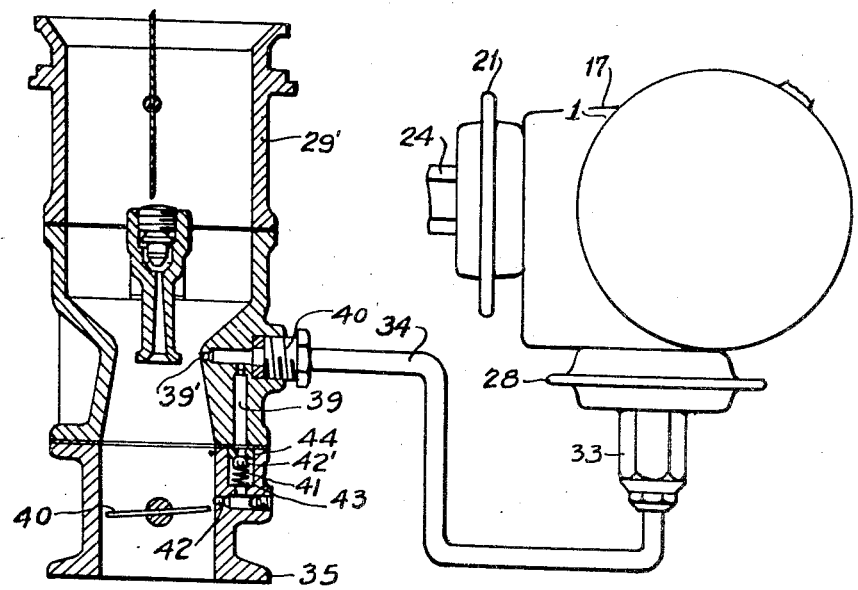
Fig. 10 shows the connection of the spark advance mechanism to the throttle and Venturi orifices of the Vanderpoel-Ostling type of carburetor construction.
Figure 9:
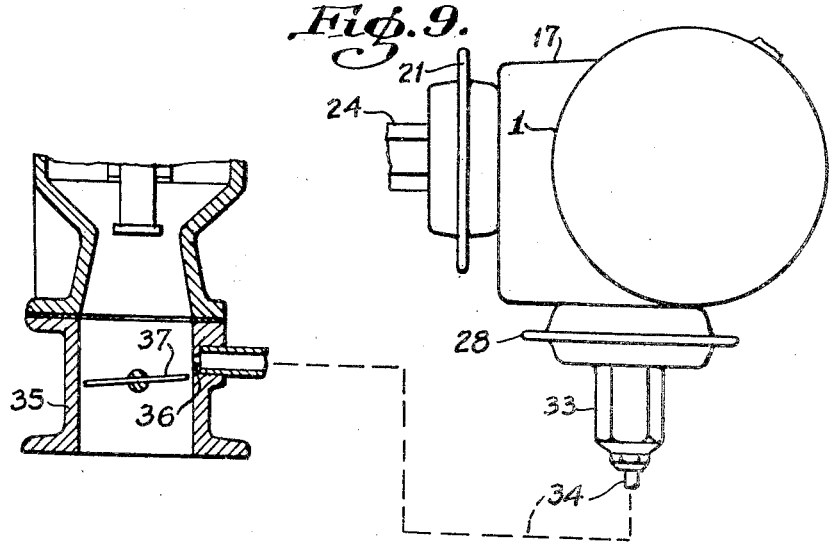
Fig. 9 shows the connection of the spark advance mechanism to the throttle orifice of one form of carburetor.

Conduit 34 is connected to a vacuum generating means which is responsive to both speeds and throttle positions. Such a device is the carburetor construction shown in Fig. 9 which is of a conventional single orifice type of throttle construction wherein the orifice 36 is so positioned in the air fuel conduit of the carburetor 35 in relation to the throttle 37 that the orifice 36 is on the fuel inlet side of the throttle 37 when the throttle is in idling position, as shown in Fig. 9, and is on the manifold side of the throttle when the throttle is open to part throttle position as in road load operations. Instead of employing a single orifice type of carburetor construction, as shown in Fig. 9, I may employ the Vanderpoel-Ostling type of construction, as shown in Fig. 10, with the check valve as shown in Fig. 10 or with the check valve omitted from the construction as shown in Fig. 10. In such a construction as shown in the prior mentioned Vanderpoel-Ostling patent, an orifice is positioned at the venturi and also at the throttle. The orifice at the venturi is illustrated at 39'. The throttle orifice 42 has the same relationship to the throttle as does the orifice 36, to wit, it is on the Venturi side of the throttle at idling and on the intake manifold side of the throttle when the throttle is at road load, i. e., part throttle position.

Line 25 may be connected to the exhaust manifold, as shown in Fig. 6, preferably at the neck of the exhaust manifold as shown in Fig. 6 or it may be connected to the discharge conduit of the water pump circulating the cooling fluid, as shown in Fig. 7, or it may, instead of the connections shown in Figs. 6 and 7, be connected to the discharge conduit of the lubricating oil pump. In the case of Figs. 7 and 8, said pumps are connected for rotation to the main power unit of the internal combustion engine.

In the case of the carburetor construction shown in Figs. 9 and 10, at cranking or at idling speed the orifice 36 or 42 is on the carburetor, i. e., inlet, side of the throttle 37 or 40, as the case may be, and the velocity of the gases through the carburetor air passages is insufficient either at the orifice 36, in the case of the construction of Fig. 9, or at the orifice 42 or 39', in the case of the construction of Fig. 10, to create a degree of vacuum in the chamber 31, the chamber 30 being at atmospheric pressure, to move the cam 6 against the retarding spring 27 which holds the cam in the position to place the cam follower 13 and consequently the cam plate 8 in full retard position.

The cam plate is not advanced over the initial setting of the advance, as will be more fully discussed hereinbelow. At the same idling or cranking speed the pressures generated in the exhaust or by the water or fuel pump are each insufficient to create a pressure in chamber 23 to overcome the retarding spring tension of the spring 19 and the cam 15 is not actuated to move the cam follower 12 to advance the cam plate 8 above the initial setting of the spark advance. The breaker plate 8 therefore remains in full retard position of the initial advance setting.

Now considering the operation at full load, that is, with the throttle wide open, the vacuum generated in the carburetor passageway is low due to the fact that the intake manifold is open to atmospheric pressure through the wide open carburetor throttle, and the magnitude of vacuum generated is directly proportional to engine speed.

In the case of the construction shown in Fig. 10, that is, the Vanderpoel-Ostling type of carburetor, with wide open throttle the pressure at the orifice 42 is greater than at orifice 39' due to the reduction in pressure at the throat of the venturi and the ball check valve 42' in chamber 43 closes against its seat 44, and therefore the vacuum generated in chamber 31 while also proportional to engine speed is at each such engine speeds higher than in the case of the construction of Fig. 9.

In Fig. 11, line C gives the vacuum in chamber 31 for all engine speeds at throttle for full load employing the carburetor construction shown in Fig. 10. With the throttle at part load position, for example, road load, the pressure at the orifice 39', in the case of the construction shown in Fig. 10, is greater than that existing at 42, valve 42' is open, and the vacuums generated in the chamber 31 at all engine speeds at such road load condition are shown on curve D of Fig. 11.

Line A illustrates the desirable or ideal full load advance for the engine under consideration at engine speeds ranging up to 3400 R. P. M. It will be seen that the advance up to 600 R. P. M. is set at the initial advance of 5° and the advance increases substantially as a straight line with engine speed. Curve B illustrates the desired advance under road load operation at all engine speeds ranging from about 600 R. P. M. up to 3400 R. P. M. It will be seen that the advance up to about 600 R. P. M., i. e., idling, is the initial advance of 5° and that the advance at each higher engine speed is greater than the corresponding advance at full load at the same engine speeds. It will also be seen that the vacuums generated in the diaphragm chamber at road load operations are at each engine speed higher than that generated in the diaphragm chamber at full load operation at the same engine speed.

Referring to Fig. 13, curve E gives the advance desired at the attainment of the vacuums indicated for road load operation and therefore illustrates the nature of the cam surface of cam 16. Cam 16 is so designed in relation to the pivot point 14, pivot sleeve 13, and the position of the cam follower 12 and the tension of the spring 37 so that upon the attainment of various degrees of vacuums in chamber 31 the cam will rotate sufficiently to advance the cam plate spark advance in the amount indicated by curve E for such vacuum. A cam thus designed will give the advance of curve B. However, at full load operation a vacuum is also exerted in chamber 31 which at various engine speeds will have the value indicated by line C, Fig. 11.

The consequent advance obtained at various engine speeds, full load operations by this cam 16 is shown in the dotted line G in the branches G—1 to G—2. It will be seen that the advance at each engine speed obtained by the operation of this cam at full load as a result of the vacuums generated at full load in chamber 31 would be insufficient, being below line A at all engine speeds less than 3400 R. P. M. Reliance, however, is not had upon this cam 16 to give the advance at full load operation, this advance being obtained by cam 15. In order to actuate this full load cam the fluid pressure actuating means, to wit, the diaphragm, is connected by line 25 to a source of fluid pressure the magnitude of which is responsive to engine speed.

One such source of pressure is the discharge pressure of the water pump employed in automotive spark ignition engines for the circulation of cooling fluid. Referring to Fig. 12, curve H illustrates the variation in pressure of the water pump discharge as a function of engine speed. This curve, therefore, gives the pressure which would be obtained in the chamber 23 at each engine speed. Curve I, Fig. 13, gives the advance which each such pressures must give in order to give the advance of line A and therefore gives the nature of the cam surface of cam 15. With the cam so designed to attain such advances on the imposition of the pressures indicated by curve I, the water pump discharge pressures of curve H will give the advance of line A.

Referring now to the advance at road load under these conditions it will be observed that since the water pump pressure is exerted in chamber 23 at the same magnitude at each engine speed whether at road load or full load operations, being independent of throttle position and only dependent on speed, the cam 15 will move to advance the cam plate along line A, but since the cam 16 advances the cam follower at each engine speed along curve B, the advance resulting from cam 16 will be greater than that of cam 15. Therefore, at road load the cam follower will be always against cam 16 and not against cam 15, while at full load the cam follower will be against cam 15 and not against cam 16. The two cams are coincident and in contact with the cam follower only at speeds in excess of 3400 R. P. M., when the road load operation becomes a full load, i. e., when the throttle is wide open, at which point curve B and line A are coincident.

If instead of employing the water pump discharge pressure, as in Fig. 7, we employ the oil pump discharge pressure, as in Fig. 8, the pressure generated in diaphragm chamber 23 at each engine speed will be that given by curve J. Curve K, Fig. 13, illustrates the advance which each degree of pressure attained in chamber 23 must attain in order to obtain the advance of curve A, and this therefore indicates the nature of the cam surfaces which must be employed when the oil pressure is employed as the motivating fluid in chamber 23. With a cam of such character one will obtain the advance of curve A when the oil pump discharge pressure has the character of curve J.

What has been said of the relative action of the two cams with respect to the use of the water pump discharge pressure applies with equal force to the oil pump discharge pressure when this is employed instead of the water pump discharge pressure.

When employing the exhaust pressure, as shown in Fig. 6, the pressure attained in the diaphragm chamber 23 is not, as in the case of the oil and water pressure, independent of throttle position, but varies with speed and with throttle position. The variation of pressure attained in chamber 23 at full load operation is illustrated in curve L, Fig. 12. Curve M illustrates the pressure attained in 23 at various engine speeds at road load operation. It will be seen that the pressure at road load operation at each engine speed is much lower than at full load operation. Curve N gives the advance which must be attained at each exhaust pressure in diaphragm chamber 23 in order to obtain an advance which corresponds to line A in Fig. 11. The curve indicates the nature of the cam surface which is necessary for cam 15 in order that the advance at full throttle operation follow line A as the result of the exhaust pressure attained at various engine speeds at full throttle. When so contoured and with the cam contoured as 16 to follow line B the advance at full load will follow curve A, and since vacuum advance attained as result of the vacuums generated at full load in diaphragm chamber 31 folplained, at full load will be controlled by cam 15 and not cam 16.

At road load operations, however, while cam 16 follows the advance of curve B, the exhaust pressures generated in chamber 23 will also advance the cam 15 as a result of the pressures which are generated at road load (see curve M). The advance of the cam 15 at various engine speeds as a result of exhaust pressure at road load at such engine speeds is given by curve O. It will be seen that the advance of cam 15 at each engine speed is far less than the advance which is caused by cam 16 and therefore at all engine speeds at road load operation the cam follower will be influenced by cam 16 and not by cam 15.

The curves illustrate a specific application to a specific condition and engine operation and a specific representation of road load, but they illuminate the principle whereby the cams 15 and 16 may be designed to give the desired road load and full load advance. Thus, the values of the vacuums, pressures, and advance as a function of engine speed at various degrees of loading will change with variation in engine design and their values at road load will change as the throttle setting and speed and load, chosen as representing road load, change. However, the nature of the cam surface required to give any chosen advance at full load and also at the chosen values of loading and throttle position, chosen as representing road load, will be obtained by the application of the principles explained in connection with the specific examples described above. The explanations referring to the curves are not, therefore, to be taken as limiting, but merely illustrative of the principles of my invention.

While I have described a particular embodiment of my invention for the purpose of illustration, it should be understood that various modifications and adaptations thereof may be made within the spirit of the invention as set forth in the appended claims.

I claim:

1. An automatic spark advance mechanism which comprises a breaker cam, a cam shaft, a circuit breaker in operative association with said breaker cam, a rotatable mounting for said circuit breaker, means for rotating said breaker mounting about the axis of said breaker cam comprising a fluid pressure power means, a cam actuated driving connection between said fluid pressure power means and said mounting, pneumatically operated power means, and a cam actuated linkage connection between said pneumatic power means and said mounting.

2. In combination with the spark advance mechanism of claim 1 a carburetor, an air and a fuel inlet to said carburetor, an air passageway in said carburetor, a venturi in the air passageway of said carburetor, a throttle in said passageway, an orifice at said throttle, said orifice at said throttle being so positioned that when the throttle is in closed position the orifice is on the air inlet side of the throttle and when the throttle is in part open position the orifice is on the carburetor discharge side of said throttle, and a conduit connecting said orifice to said pneumatically operated power means.

3. In the automatic spark advance mechanism of claim 1, a spark ignition engine in operative association with said spark advance mechanism, a source of fluid pressure associated with said engine and responsive to engine speed, said fluid pressure power means comprising a diaphragm chamber, a diaphragm in said chamber, said driving connection being connected to said diaphragm, and means for conveying fluid pressure from said source of fluid pressure to said diaphragm chamber of said fluid pressure power means.

4. In the automatic spark advance mechanism of claim 1, a spark ignition engine containing an exhaust manifold in operative association with said spark advance mechanism, said fluid pressure actuated power means comprising a diaphragm chamber, a diaphragm in said chamber, a conduit connected to said diaphragm chamber, said conduit being connected to said exhaust manifold.

5. In the automatic spark advance mechanism of claim 1, a spark ignition engine in operative association with said spark advance mechanism, said fluid pressure actuated power means comprising a diaphragm chamber, a diaphragm in said chamber, a conduit connected to said diaphragm chamber, a water circulating pump connected to said spark ignition engine for circulation of water, a water discharge conduit from said pump, and a by-pass conduit connected to said pump discharge conduit and to said diaphragm chamber of said fluid pressure actuated power means.

6. In the automatic spark advance mechanism of claim 1, a spark ignition engine in operative association with said spark advance mechanism, an oil pump operatively connected to said engine for circulation of lubricating oil to said engine, an oil discharge line from said pump, and a by-pass conduit connected to said pump discharge and to said diaphragm chamber of said fluid pressure actuated power means.

7. An automatic spark advance mechanism which comprises a breaker cam, a cam shaft, a circuit breaker in operative association with said breaker cam, a rotatable mounting for said circuit breaker, means for rotating said breaker mounting about the axis of said breaker cam comprising a plurality of rotatable cams, a cam follower mounted upon said breaker mounting in driving relation with said cams, a fluid pressure operated power means, a rod connecting said power means to one of said cams, a pneumatically operated power means, and a rod connecting said pneumatically operated power means to another of said cams.

8. In combination with the spark advance mechanism of claim 7, a carburetor, an air and a fuel inlet to said carburetor, an air passageway in said carburetor, a venturi in the air passageway of said carburetor, a throttle in said passageway, an orifice at said throttle, said orifice at said throttle being so positioned that when the throttle is in closed position the orifice is on the air inlet side of the throttle and when the throttle is in part open position the orifice is on the carburetor discharge side of said throttle, and a conduit connecting said orifice to said diaphragm chamber and said pneumatically operated power means.

9. In the automatic spark advance mechanism of claim 7, a spark ignition engine associated with said spark advance mechanism, a source of fluid pressure generating means associated with said engine and responsive to engine speed, said fluid pressure operating power means comprising a diaphragm chamber, a diaphragm in said chamber connected to said first mentioned rod connecting said power means to one of said cams, and means for conveying fluid pressure from said fluid pressure generating means to said diaphragm chamber of said fluid pressure power means.

10. In the automatic spark advance mechanism of claim 7, a spark ignition engine containing an exhaust manifold in operative association with said spark advance mechanism, said fluid pressure actuated power means comprising a diaphragm chamber, a diaphragm in said chamber, and a conduit connected to said diaphragm chamber, said conduit being connected to said exhaust manifold.

11. In the automatic spark advance mechanism of claim 7, a spark ignition engine in operative association with said spark advance mechanism, said fluid pressure actuated power means comprising a diaphragm chamber, a diaphragm in said chamber, a conduit connected to said diaphragm chamber, a water circulating pump connected to said spark ignition engine for circulation of water, a water discharge conduit from said pump, a by-pass conduit connected to said pump discharge conduit and to said diaphragm chamber of said fluid pressure actuated power means.

12. In the automatic spark advance mechanism of claim 7, a spark ignition engine in operative association with said spark advance mechanism, an oil pump operatively connected to said engine for circulation of lubricating oil to said engine, an oil discharge line from said pump, and a by-pass conduit connected to said pump discharge and to said diaphragm chamber of said fluid pressure actuated power means.

13. An automatic spark advance mechanism which comprises a breaker cam, a cam shaft, a circuit breaker in operative association with said breaker cam, a breaker plate upon which said breaker is mounted, said breaker plate being mounted for rotation about the axis of said breaker cam, a cam follower mounted on said breaker plate, a case enclosing said spark advance mechanism, a pin mounted in said case, a plurality of independently rotatable cams mounted upon said pin in driving relation with said cam follower, a fluid pressure actuated power means, a connection between said fluid pressure actuated power means and one of said cams, a pneumatically operated power means, and a link connection between said pneumatically operated power means and another of said cams.

14. In combination with the spark advance mechanism of claim 13, a carburetor, an air and a fuel inlet to said carburetor, an air passageway in said carburetor, a venturi in the air passageway of said carburetor, a throttle in said passageway, an orifice at said throttle, said orifice at said throttle being so positioned that when the throttle is in closed position the orifice is on the air inlet side of the throttle and when the throttle is in part open position the orifice is on the carburetor discharge side of said throttle, and a conduit connecting said orifice to said pneumatically operated power means.

15. In the automatic spark advance mechanism of claim 13, a spark ignition engine in operative association with said spark advance mechanism, a source of fluid pressure associated with said engine and responsive to engine speed, said fluid pressure power means comprising a diaphragm chamber, a diaphragm in said chamber, said driving connection being connected to said diaphragm, and means for conveying fluid pressure from said source of fluid pressure to said diaphragm chamber of said fluid pressure power means.

16. In the automatic spark advance mechanism of claim 13, a spark ignition engine containing an exhaust manifold in operative association with said spark advance mechanism, said fluid pressure actuated power means comprising a diaphragm chamber, a diaphragm in said chamber, and a conduit connected to said diaphragm chamber, said conduit being connected to said exhaust manifold.

17. In the automatic spark advance mechanism of claim 13, a spark ignition engine in operative association with said spark advance mechanism, said fluid pressure actuated power means comprising a diaphragm chamber, a diaphragm in said chamber, a conduit connected to said diaphragm chamber, a water circulating pump connected to said spark ignition engine for circulation of water, a water discharge conduit from said pump, a by-pass conduit connected to said pump discharge conduit and to said diaphragm chamber of said fluid pressure actuated power means.

18. In the automatic spark advance mechanism of claim 13, a spark ignition engine in operative association with said spark advance mechanism, an oil pump operatively connected to said engine for circulation of lubricating oil to said engine, an oil discharge line from said pump, and a by-pass conduit connected to said pump discharge and to said diaphragm chamber of said fluid pressure actuated power means.

19. In the spark advance mechanism of claim 13, said fluid pressure actuated means comprising a diaphragm chamber, a diaphragm in said chamber, a connection between said diaphragm and said link, a conduit connecting said diaphragm chamber and a source of fluid pressure, said pneumatically operated power means comprising a diaphragm chamber, a diaphragm in said diaphragm chamber, a connection between said last named diaphragm and said other of said cams, and a conduit for connecting said diaphragm chamber to a carburetor of a spark ignition engine.

20. In an automatic spark advance mechanism, the combination of: a breaker cam, a cam shaft, a circuit breaker in operative association with said breaker cam, a breaker plate upon which said breaker is mounted, said breaker plate being mounted for rotation about the axis of said breaker cam, a cam follower mounted on said breaker plate, a case enclosing said spark advance mechanism, a pin mounted in said case, a plurality of independently rotatable cams mounted upon said pin in driving relation with said cam follower, a fluid pressure actuated power means, a connection between said fluid pressure actuated power means and one of said cams, a pneumatically operated power means, a link connection between said pneumatically operated power means and another of said cams, said fluid pressure actuated means comprising a diaphragm chamber, a diaphragm in said chamber, a connection between said diaphragm and said link, a conduit connecting said diaphragm chamber and a source of fluid pressure, said pneumatically operated power means comprising a diaphragm chamber, a diaphragm in said diaphragm chamber, a connection between said last-named diaphragm and said other of said cams, a conduit for connecting said diaphragm chamber to a carburetor of a spark ignition engine, a source of fluid pressure associated with said engine, and a connection between said source of fluid pressure and said fluid pressure power means.

21. In the automatic spark advance mechanism of claim 20, a spark ignition engine in operative association with said spark advance mechanism and connected to said carburetor, said source of fluid pressure comprising a water circulating pump connected to said spark ignition engine for circulation of water, a water discharge conduit from said pump, and a by-pass conduit connected to said pump discharge conduit and to said conduit connected to the diaphragm chamber of said fluid pressure actuated power means.

22. In the automatic spark advance mechanism of claim 20, a spark ignition engine in operative association with said spark advance mechanism and connected to said carburetor, said source of fluid pressure comprising an oil pump operatively connected to said engine for circulation of lubricating oil to said engine, an oil discharge line from said pump, and a by-pass conduit connected to said pump discharge and to said diaphragm of said fluid pressure actuated power means.

23. In the automatic spark advance mechanism of claim 20, a spark ignition engine connected to said carburetor, said fluid pressure associated with said engine and responsive to engine speed, comprising the exhaust manifold of said engine, and means for conveying fluid pressure from said manifold to said diaphragm chamber of said fluid pressure power means.

24. In the spark advance mechanism of claim 20, said carburetor comprising an air and a fuel inlet to said carburetor, an air passageway in said carburetor, a venturi in the air passageway of said carburetor, a throttle in said passageway, an orifice at said throttle, said orifice at said throttle being so positioned that when the throttle is in closed position the orifice at said throttle being so positioned that when the throttle is in closed position the orifice is on the air inlet side of the throttle and when the throttle is in part open position the orifice is on the carburetor discharge side of said throttle, and a conduit connecting said orifice to said diaphragm chamber and said pneumatically operated power means.

25. In an automatic spark advance mechanism, the combination of: a breaker cam, a cam shaft, a circuit breaker in operative association with said breaker cam, a rotatable mounting for said circuit breaker, means for rotating said breaker mounting about the axis of said breaker cam comprising a fluid pressure power means including a diaphragm chamber, a diaphragm in said chamber, a cam actuated driving connection between said diaphragm and said mounting, pneumatically operated power means, a cam actuated linkage connection between said pneumatic power means and said mounting, a carburetor, an air and a fuel inlet to said carburetor, an air passageway in said carburetor, a venturi in the air passageway of said carburetor, a throttle in said passageway, an orifice at said throttle, said orifice at said throttle being so positioned that when the throttle is in closed position the orifice is on the air inlet side of the throttle and when the throttle is in part open position the orifice is on the carburetor discharge side of said throttle, and a conduit connecting said orifice to said pneumatically operated power means.

26. In the automatic spark advance mechanism of claim 25, a spark ignition engine in operative association with said spark advance mechanism, said fluid pressure actuated power means comprising a diaphragm chamber, a diaphragm in said chamber, a conduit connected to said diaphragm chamber, a water circulating pump connected to said spark ignition engine for circulation of water, a water discharge conduit from said pump, and a by-pass conduit connected to said pump discharge conduit and to said diaphragm chamber of said fluid pressure actuated power means.

27. In the automatic spark advance mechanism of claim 25, a spark ignition engine in operative association with said spark advance mechanism, an oil pump operatively connected to said engine for circulation of lubricating oil to said engine, an oil discharge line from said pump, and a by-pass conduit connected to said pump discharge and to said diaphragm chamber of said fluid pressure actuated power means.

28. In the automatic spark advance mechanism of claim 25, a spark ignition engine connected to said carburetor, said source of fluid pressure including an exhaust manifold associated with said engine and responsive to engine speed, and a conduit connecting said diaphragm of said fluid pressure generating means to said exhaust manifold.

29. In an automatic spark advance mechanism, the combination of: a breaker cam, a cam shaft, a circuit breaker in operative association with said breaker cam, a rotatable mounting for said circuit breaker, means for rotating said breaker mounting about the axis of said breaker cam comprising a plurality of rotatable cams, a cam follower mounted upon said breaker mounting in driving relation with said cams, a fluid pressure operated power means comprising a diaphragm chamber, a diaphragm in said chamber, a rod connecting said diaphragm to one of said cams, a pneumatically operated power means, a rod connecting said pneumatically operated power means to another of said cams, a carburetor, an air and a fuel inlet to said carburetor, an air passageway in said carburetor, a venturi in the air passageway of said carburetor, a throttle in said passageway, an orifice at said throttle, said orifice at said throttle being so positioned that when the throttle is in closed position the orifice is on the air inlet side of the throttle and when the throttle is in part open position the orifice is on the carburetor discharge side of said throttle, a conduit connecting said orifice to said diaphragm chamber and said pneumatically operated power means, and a spark ignition engine containing an exhaust manifold and said carburetor in operative association with said spark advance mechanism.

30. In the automatic spark advance mechanism of claim 29, a spark ignition engine in operative association with said spark advance mechanism, said fluid pressure actuated power means comprising a diaphragm chamber, a diaphragm in said chamber, a conduit connected to said diaphragm chamber, a water circulating pump connected to said spark ignition engine for circulation of water, a water discharge conduit from said pump, and a by-pass conduit connected to said pump discharge conduit and to said diaphragm chamber of said fluid pressure actuated power means.

31. In the automatic spark advance mechanism of claim 29, a spark ignition engine in operative association with said spark advance mechanism, said fluid pressure means comprising a diaphragm chamber, a diaphragm in said chamber, an oil pump operatively connected to said engine for circulation of lubricating oil to said engine, an oil discharge line from said pump, and a by-pass conduit connected to said pump discharge and to said diaphragm chamber of said fluid pressure actuated power means.

32. In the automatic spark advance mechanism of claim 29, a spark ignition engine connected to said carburetor, an exhaust manifold associated with said engine, and a conduit connecting said diaphragm chamber of said fluid pressure generating means to said exhaust manifold.

33. In an automatic spark advance mechanism the combination of: a breaker cam, a cam shaft, a circuit breaker in operative association with said breaker cam, a breaker plate upon which said breaker is mounted, said breaker plate being mounted for rotation about the axis of said breaker cam, a cam follower mounted on said breaker plate, a case enclosing said spark advance mechanism, a pin mounted in said case, a plurality of independently rotatable cams mounted upon said pin in driving relation with said cam follower, a fluid pressure actuated power means comprising a diaphragm chamber, a diaphragm in said chamber, a connection between said diaphragm and one of said cams, a pneumatically operated power means, a link connection between said pneumatically operated power means and another of said cams, a carburetor, an air and a fuel inlet to said carburetor, an air passageway in said carburetor, a venturi in the air passageway of said carburetor, a throttle in said passageway, an orifice at said throttle, said orifice at said throttle being so positioned that when the throttle is in closed position the orifice is on the air inlet side of the throttle and when the throttle is in part open position the orifice is on the carburetor discharge side of said throttle, a conduit connecting said orifice to said pneumatically operated power means, and a spark ignition engine containing an exhaust manifold and said carburetor in operative association with said spark advance mechanism.

34. In the automatic spark advance mechanism of claim 33, a spark ignition engine in operative association with said spark advance mechanism, said fluid pressure actuated power means comprising a diaphragm chamber, a diaphragm in said chamber, a conduit connected to said diaphragm chamber, a water circulating pump connected to said spark ignition engine for circulation of water, a water discharge conduit from said pump, and a by-pass conduit connected to said pump discharge conduit and to said diaphragm chamber of said fluid pressure actuated power means.

35. In the automatic spark advance mechanism of claim 33, a spark ignition engine in operative association with said spark advance mechanism, an oil pump operatively connected to said engine for circulation of lubricating oil to said engine, an oil discharge line from said pump, and a by-pass conduit connected to said pump discharge and to said diaphragm chamber of said fluid pressure actuated power means.

36. In the automatic spark advance mechanism of claim 33, a spark ignition engine connected to said carburetor, an exhaust manifold associated with said chamber of said fluid pressure generating means, and a conduit connecting said diaphragm chamber of said fluid pressure generating means and said exhaust manifold.

37. In an automatic spark advance mechanism, the combination of: a breaker cam, a cam shaft, a circuit breaker in operative association with said breaker cam, a breaker plate upon which said breaker is mounted, said breaker plate being mounted for rotation about the axis of said breaker cam, a cam follower mounted on said breaker plate, a case enclosing said spark advance mechanism, a pin mounted in said case, a plurality of independently rotatable cams mounted upon said pin in driving relation with said cam follower, a fluid pressure actuated power means including a diaphragm chamber, a diaphragm in said chamber, a connection between said diaphragm and one of said cams, a pneumatically operated power means, a link connection between said pneumatically operated power means and another of said cams, said fluid pressure actuated means comprising a diaphragm chamber, a diaphragm in said chamber, a connection between said diaphragm and said link, a conduit connecting said diaphragm chamber and a source of fluid pressure, said pneumatically operated power means comprising a diaphragm chamber, a diaphragm in said diaphragm chamber, a connection between said last-named diaphragm and said other of said cams, a conduit for connecting said diaphragm chamber to a carburetor of a spark ignition engine, a carburetor, said carburetor comprising an air and a fuel inlet to said carburetor, an air passageway in said carburetor, a venturi in the air passageway of said carburetor, a throttle in said passageway, an orifice at said throttle, said orifice at said throttle being so positioned that when the throttle is in closed position the orifice is on the air inlet side of the throttle and when the throttle is in part open position the orifice is on the carburetor discharge side of said throttle, and a conduit connecting said orifice to said diaphragm chamber and said pneumatically operated power means.

38. In the automatic spark advance mechanism of claim 37, a spark ignition engine in operative association with said spark advance mechanism and connected to said carburetor, said source of fluid pressure comprising a water circulating pump connected to said spark ignition engine for circulation of water, a water discharge conduit from said pump, and a by-pass conduit connected to said pump discharge conduit and to said conduit connected to the diaphragm chamber of said fluid pressure actuated power means.

39. In the automatic spark advance mechanism of claim 37, a spark ignition engine in operative association with said spark advance mechanism and connected to said carburetor, said source of fluid pressure comprising an oil pump operatively connected to said engine for circulation of lubricating oil to said engine, an oil discharge line from said pump, and a by-pass conduit connected to said pump discharge and to said diaphragm chamber of said fluid pressure actuated power means.

40. In the automatic spark advance mechanism of claim 37, a spark ignition engine connected to said carburetor, an exhaust manifold associated with said engine, and means for conveying fluid pressure from said exhaust manifold to said diaphragm chamber of the fluid pressure means.

WILLIAM OSTLING.

No references cited.